(12) United States Patent
Radhakrishnan et al.

(10) Patent No.: US 10,309,565 B2
(45) Date of Patent: Jun. 4, 2019

(54) ANCHORING ARRANGEMENT FOR A PROTECTIVE SLEEVE

(71) Applicant: Australasian Steel Products Pty Ltd., Footscray, Victoria (AU)

(72) Inventors: Ashok Radhakrishnan, Footscray (AU); Ernest Byrnes, Footscray (AU); Leigh Wayne Morrison, Footscray (AU)

(73) Assignee: Australasian Steel Products Pty Ltd., Footscray, Victoria (AU)

( * ) Notice: Subject to any disclaimer, the term of this patent is extended or adjusted under 35 U.S.C. 154(b) by 39 days.

(21) Appl. No.: 15/313,500

(22) PCT Filed: May 27, 2015

(86) PCT No.: PCT/AU2015/000313
§ 371 (c)(1),
(2) Date: Nov. 22, 2016

(87) PCT Pub. No.: WO2015/179896
PCT Pub. Date: Dec. 3, 2015

(65) Prior Publication Data
US 2017/0241580 A1     Aug. 24, 2017

(30) Foreign Application Priority Data

May 29, 2014   (AU) ................................ 2014902050
Mar. 6, 2015   (AU) ................................ 2015900801

(51) Int. Cl.
*F16L 33/207*   (2006.01)
*F16L 35/00*    (2006.01)
*F16L 55/00*    (2006.01)

(52) U.S. Cl.
CPC ............. *F16L 33/207* (2013.01); *F16L 35/00* (2013.01); *F16L 55/005* (2013.01)

(58) Field of Classification Search
CPC .......... F16L 33/207; F16L 35/00; F16L 55/05
(Continued)

(56) References Cited

U.S. PATENT DOCUMENTS 2,076,632 A * 4/1937 Goodall .................. F16L 11/00
                                                  138/109
3,831,635 A * 8/1974 Burton .................... F16L 35/00
                                                  138/103
(Continued)

FOREIGN PATENT DOCUMENTS

EP     0 655 377         5/1995
WO     2006/002459 A1    1/2006
WO     2010/003174 A1    1/2010

OTHER PUBLICATIONS

International Search Report and Written Opinion dated Jul. 20, 2015 in international application No. PCT/AU2015/000313, 7 pgs.

*Primary Examiner* — Craig M Schneider
*Assistant Examiner* — David R Deal
(74) *Attorney, Agent, or Firm* — Merchant & Gould P.C.

(57) ABSTRACT

An anchor of an anchoring arrangement for a protective sleeve which locates, in use, over a conduit assembly, the conduit assembly including a conduit end connector configured to engage and fasten an end of a conduit to a conduit connection assembly. The anchor comprises a mounting element which is configured, in use, to be removably mountable on and around at least a portion of the conduit end connector, the mounting element having an outer side; and at least one fastening groove formed in and extending around the outer side of the mounting element. Each fastening groove is configured to receive, in use, a portion of a co-located protective sleeve and at least one securing element such that the securing element captures a portion of a (Continued)

co-located protective sleeve between the securing element and the mounting element within a cooperating fastening groove.

20 Claims, 5 Drawing Sheets

(58) Field of Classification Search
USPC .................................................. 138/110, 109
See application file for complete search history.

(56) References Cited

U.S. PATENT DOCUMENTS

| | | | | |
|---|---|---|---|---|
| 5,417,461 | A * | 5/1995 | Dougherty | F16L 33/2076 |
| | | | | 285/256 |
| 5,816,622 | A * | 10/1998 | Carter | F16L 33/00 |
| | | | | 285/45 |
| 7,992,903 | B1 | 8/2011 | Desimone | |
| 8,141,593 | B2 * | 3/2012 | Francois | H02G 15/1833 |
| | | | | 138/110 |
| 9,810,351 | B2 * | 11/2017 | Gjerde | F16L 11/20 |
| 2005/0081935 | A1 * | 4/2005 | Shimizu | F16L 19/0231 |
| | | | | 138/109 |
| 2005/0229988 | A1 * | 10/2005 | Asta | F16L 3/2334 |
| | | | | 138/110 |
| 2010/0175772 | A1 * | 7/2010 | Knotten | F16L 39/02 |
| | | | | 138/97 |
| 2011/0139290 | A1 | 6/2011 | Duell | |
| 2012/0242077 | A1 * | 9/2012 | Shraga | F16L 35/00 |
| | | | | 285/39 |
| 2013/0213514 | A1 * | 8/2013 | Berardi | F16L 33/003 |
| | | | | 285/294.4 |

* cited by examiner

ANCHORING ARRANGEMENT FOR A PROTECTIVE SLEEVE

TECHNICAL FIELD

Aspects of the present invention relate generally to an anchoring arrangement for a protective sleeve for a conduit such as, but not limited to, a hose or pipe. More particularly, certain aspects of the invention relate to an anchoring arrangement for a protective sleeve which can be mounted to and around a large variety of conduit and conduit connector configurations.

BACKGROUND

The following discussion of the background is intended to facilitate an understanding of the invention. However, it should be appreciated that the discussion is not an acknowledgement or admission that any of the material referred to was published, known or part of the common general knowledge as at the priority date of the application.

The integrity of conduits and conduit assemblies that convey hydraulic or pneumatic fluids in such systems is critical. Failed conduits can cause serious damage to surrounding machinery, as well as cause injury to personnel, particularly in high pressure applications. Conduits can fail at a point which is at or proximate to a conduit coupling (or anchor) causing the free end of the conduit to whip about violently. Furthermore, conduits which fail at any point along their length may splash, spray or mist fluid (and material entrained therein) onto surrounding machinery, components or personnel.

In order to reduce injury and danger, relevant conduits can include a reinforced or strengthened outer layer integrated or combined with the conduit. Alternatively, the relevant conduits could be enclosed with a protective sleeve or sheath designed to form a protective barrier between people or machinery and the ruptured conduit and fluid (or other working mediums) erupting therefrom.

Examples of such protective sleeves are provided in International Patent Publication WO2006/002459. This patent publication describes a hydraulic or pneumatic hose assembly which has a protective sleeve mounted over the hose assembly. The protective sleeve comprises a seamless woven fabric sleeve which is fitted loosely about the hose with a gap between the cover and the hose. The protective sleeve is anchored at both ends to act as a whip check to contain whipping of the hose should the hose assembly fail and to act as a fluid suppression device.

In a first embodiment of WO2006/002459, the protective sleeve is crimped to the hose couplings by a metal crimping sleeve or ferrule. Sealing the ends of the protective sleeve with a crimping sleeve or ferrule can create a fluid seal between the coupling, hose and protective seal. In the event of hose failure, fluid can be retained within the protective sleeve, causing pressure to build up in that sleeve. Significant pressure build up can lead to ballooning of the protective sleeve and in some cases failure, which again can cause injury to proximate persons and damage to surrounding machinery.

In a second embodiment of WO2006/002459, the protective sleeve includes two spaced apart eyelets in each distal end of the sleeve through which the ends of anchoring staples can be received. The anchoring staples are received in a staple groove formed in a section of a staple coupling attached to the hose. The staple provides a gap through which fluid can escape in the event of hose failure. However, whilst this arrangement provides suitable anchoring for staple couplings, no suitable anchoring arrangement is described for use with other types of hose couplings.

It would therefore be desirable to provide an improved and/or alternate anchor and associated anchoring arrangement for a protective sleeve that can be located around a conduit, such as a hose or pipe.

SUMMARY

A first aspect of the present invention provides an anchor of an anchoring arrangement for a protective sleeve which locates, in use, over a conduit assembly. The conduit assembly includes a conduit end connector configured to engage and fasten an end of a conduit to a conduit connection assembly. The anchor comprises: a mounting element which is configured, in use, to be removably mountable on and around at least a portion of the conduit end connector; and at least one fastening groove formed in and extending around an outer side of the mounting element. Each fastening groove is configured to receive, in use, a portion of a co-located protective sleeve and at least one securing element such that the securing element captures a portion of a co-located protective sleeve between the securing element and the mounting element within a cooperating fastening groove.

In some embodiments, an anchoring arrangement includes one or more anchors that mounts around at least a portion of the conduit end connector of a conduit assembly. The conduit end connector of a conduit assembly generally has a standard configuration and dimension for a wide variety of conduit assemblies. This results in this anchoring arrangement having a wide usage on a large variety of conduit assemblies.

The mounting body advantageously includes at least one fastening groove, configured, in use, to receive and assist capture of a portion of the protective sleeve and a portion of a cooperating securing element within that fastening groove between the securing element and the mounting element. The anchoring arrangement is therefore simple to use and need only be mounted over a suitable conduit end connector and then the securing element applied over the respective portion of the protective sleeve to mount and anchor the protective sleeve in place.

The mounting element is configured, in use, to be removably mountable on and around at least a portion of a conduit end connector. In some embodiments, the mounting element is configured, in use, to seat over at least a portion of a conduit end connector of a conduit connection assembly. It should be understood that a conduit end connector comprises a fitting which attaches the conduit to the conduit connection assembly. In one embodiment, this comprises a ferrule arrangement. A ferrule arrangement generally includes a connector sleeve or nut operatively connected to a compression arrangement which is mounted around an end of a conduit to connect a fitting, in this case a conduit connection assembly, to the end of the conduit. The compression arrangement typically includes a male-stem portion that is insertable into a hose end and the connector sleeve (also known as a ferrule sleeve) that is concentric with the male-stem. Together, the male-stem and connector sleeve define an annular cavity for receiving a hose end. The connector sleeve is operatively connected to the male-stem to attach the ferrule arrangement around a portion of the end of a respective conduit. In such embodiments, the mounting body is preferably mounted around a portion of the connector sleeve or nut.

Any number of anchors can be used in the anchoring assembly for anchoring the protective sleeve relative to a length of conduit in a conduit assembly. The one or more anchors may be provided in any suitable arrangement which may advantageously minimise or prevent a conduit from whipping if fluid or other working medium erupts through a rupture point/zone or damaged area of a conduit which is covered by the protective sleeve. Furthermore, the one or more anchors can be arranged relative to the conduit to assist the protective sleeve function to at least partially capture any fluid or other working medium which erupts through a rupture point/zone of the conduit and is directed or dispelled towards one or more ends of the protective sleeve.

The mounting element of each anchor is designed to be removably mounted around a portion of the conduit end connector. The mounting element therefore preferably includes at least two axial ends (axial relative to a longitudinal axis extending along the length of the mounting element) including openings through which a portion of the conduit assembly extends when mounted on a conduit end connector. In some embodiments, for example where the mounting element comprises a sleeve, an inner cavity is defined between the two openings. The opening can be of any suitable shape, such as round, oval, polygonal such as square, rectangular, triangular, pentagonal, hexagonal, octagonal or any other regular polygon.

In some embodiments, the mounting element includes an inner cavity in which a cooperating portion of the conduit end connector is received. The inner cavity may include a stop formation configured to, in use, prevent the mounting element from moving axially along length of conduit end connector towards a conduit receiving end of the conduit end connector. It should be appreciated that the conduit receiving end of the conduit end connector comprises the end through which a conduit is received and extends out from when mounted within the conduit end connector. The stop can have any suitable configuration. In some embodiments, the stop formation comprises a shoulder, step, taper, spigot, projection, or flange. In preferred embodiments, the stop formation comprises a step, shoulder, curve, flange or taper which reduces the size, preferably the inner diameter of the inner cavity.

In some embodiments, the stop formation comprises an annular flange, preferably a radially extending annular flange (relative to a longitudinal axis extending along the length of the mounting element). The flange preferably includes an opening having a smaller diameter than the inner cavity. The opening can have any shape. In some embodiments, the opening has a generally circular shape. It can be desirable for the opening to include one or more radial cut-out sections providing drainage ports or fluid release ports for any fluid that may be trapped within a cooperative or co-located protective sleeve (for example in the case of conduit failure, fluid leakage from that damaged conduit). Embodiments may therefore have an annular flange which includes at least one cut-out section radially extending from the opening into the flange. The cut-out section provides a port for fluid drainage through the mounting element.

In preferred embodiments, the openings and/or inner cavity has a cooperative configuration to the portion of the conduit end connector it is designed to receive and be seated about. Preferably, the opening comprises a round or circular opening.

The mounting element can similarly have any suitable shape and/or configuration. In some embodiments, the mounting element comprises a polygonal body shape, such as square, triangular or the like. In some embodiments, the mounting element comprises a sleeve. The sleeve can be preferably configured as a ring, cylinder, partial ring, or partial or truncated cylinder. In other embodiments, the mounting element may comprise a plate, or segment of a ring or cylinder.

In some embodiments, the mounting element comprises a unitary or one piece body. In other embodiments, the mounting element is formed from at least two releasably securable sections or parts which can be fastened or secured together to construct the mounting element. The use of two releasably securable sections or parts enable easy fitting and removal of the mounting body over the cooperating/selected mount portion of the conduit end connector. The releasably securable parts are preferably movable between an open position enabling the mounting element to be located on a portion of the conduit assembly, and a closed position, in which the mounting element can be fastened to substantially annularly extend around the selected portion of the conduit assembly. The releasably securable sections may comprise at least a first section and a second section.

In some embodiments, each of the first section and second section include at least one pair of cooperating fastening elements for releasably fastening each section together. The sections therefore move between an open position in which the two sections are apart, and a closed position in which the two sections are fastened together using the cooperating fastening elements.

Any number of pairs of cooperating fastening elements can be used in the first section and the second section of the mounting element. In some embodiments, first section and the second section including a single pair of cooperating fastening elements, with each section including one part of the cooperating pair. In other embodiments, first section and the second section including two or more cooperating fastening elements. In such embodiments, the each fastening element is preferably axially spaced apart relative to the longitudinal axis of the mounting element.

The cooperating fastening elements can comprise any suitable interlockable formations including (but not limited to) at least one of a clasp, clip, pin, peg, plug, lock, tie, latch, hook or the like. In some embodiments, the cooperating fastening elements comprise complementary and interengaging pin or peg and recess. The pin or peg preferably has a shape which interlocks within the shape of the recess. In some embodiments, the pin or peg is angled in a direction to resist applied force for example an axial force, applied to the mounting body. The angle is preferably between 20 to 50 degrees relative to the longitudinal axis of the mounting body, in an opposite direction to the applied force, preferably in a direction towards a conduit connector of the conduit connection assembly.

In other embodiments, the mounting element can include a pivot or hinge portion which enables the first section to be moved, preferably pivoted, relative to the second section of the mounting element. The first and second sections are also preferably releasably fastened together at the ends (distal ends) of those sections which are moved apart about the hinge or pivot. Those distal ends may include a cooperating fastening or securing means such as (but not limited to) a clasp, clip, pin, peg, plug, lock, tie, latch, hook or the like. In some embodiments, the mounting element has a clam configuration.

In some embodiments, the mounting element may include a split or break which enables the shape of mounting element to be bent, deformed or otherwise manipulated to be mounted or seated on and around a selected portion of the conduit assembly. For example, in one embodiment, the mounting element comprises a split ring.

In yet other embodiments, the mounting element comprises a clip, preferably a resilient clip. In these embodiments, the mounting element is preferably formed of a resilient and/or elastic material to allow the mounting element to resilient deform in a manner in which it can be mounted around a portion of a conduit end connector. The clip form of the mounting body preferably includes a longitudinal opening through which, in use, a section of a conduit assembly can pass to removably locate the mounting body onto a portion of a conduit end connector of a conduit connector assembly. The mounting body can include a pair of arms spaced apart about the longitudinal opening which can be resiliently deformed to fasten the mounting body around a portion of the conduit end connector.

In some embodiments, the mounting element comprises a plate, half pipe or similarly shaped body designed to seat over at least a portion of a conduit end connector. The plate is held in place on the conduit end connector through the application of the securing elements once the protective sleeve is fixed in place between the mounting element and the securing element.

The fastening groove is used as a formation or anchor point in the mounting body for receiving a cooperating securing element. Each fastening groove can have any suitable configuration, including at least one of a furrow, channel, trench, trough, canal, gouge, hollow, indentation, rut, gutter, cutting, cut, score, fissure, or seam formed in the outer side of the mounting body. In some embodiments, the fastening groove comprises an annularly extending channel which extends substantially around the outer side of the mounting element.

The mounting body of each anchor can include any number of fastening grooves extending from the mounting element. Some embodiments include a single fastening groove. However, it is preferred that the anchoring assembly includes at least two fastening grooves. Each fastening groove is preferably spaced apart, more preferably axially spaced apart along the length of the mounting element. In order to provide secure attachment around the entire perimeter of the protective sleeve, it is preferable that each fastening groove is evenly spaced apart along the length of the mounting element.

In a second aspect, an anchoring arrangement for a protective sleeve which locates, in use, over a conduit assembly. The conduit assembly includes a conduit end connector configured to engage and fasten an end of a conduit to a conduit connection assembly. The anchoring arrangement comprises: at least one anchor according to the first aspect discussed above; and at least one securing element configured to be receivable within a cooperating fastening groove of the mounting element. In use, at least one securing element captures a portion of a co-located protective sleeve between the securing element and the mounting element of an anchor within a cooperating fastening groove of that anchor.

Each securing element is preferably configured to extend and engage over the respective portion of a protective sleeve. The securing element comprises any suitable elongate fastener which can be received within the fastening groove to capture a portion of a protective sleeve between itself and the mounting body within that fastening groove. In preferred forms, the securing element or elements capture a portion of protective sleeve about the fastening groove between the securing element and the mounting element. In some embodiments, the securing element comprises at least one of a string, thread, thong, lace, ribbon, strap, tape, tie, line, rope, cable, wire, ligature, twine, yarn, elastic, braid, cord or the like.

In preferred embodiments, the securing element comprises an elongate fastener, preferably at least one of a cord, chain, cable, band or tie. In exemplary embodiments, the securing element comprises a cable tie. The cable tie can be manufactured from a suitable material such as polymeric, for example nylon, or metallic, for example stainless steel.

It should be appreciated that in some embodiments of the securement arrangement the mounting element may also include one or more additional lugs, arms, projection or other such attachment points or formations for the attachment of additional restraints, connectors, or the like.

In a third aspect, a protective sleeve assembly includes a protective sleeve sized to fit over the at least one conduit with a gap between the cover and the conduit. The protective sleeve assembly also includes an anchoring arrangement according to the second aspect discussed above. In use, at least one securing element captures a portion of a co-located protective sleeve between the securing element and the mounting element of an anchor within a cooperating fastening groove of that anchor.

The protective sleeve can be constructed from any suitable material. One example of a suitable sleeve is described in the Applicant's earlier international patent publication WO2010/003174 which comprises a multilayer construction of a woven outer layer and an inner elastomeric layer. The protective sleeve may be formed of a closed-weave material, and may be, for example, made of textiles material. The protective sleeve may, for example, be made of multifilament nylon. However, it should be appreciated that any suitable construction can be used with the present invention.

The protective sleeve may have any one or more attributes of particular benefit in certain applications. These attributes include:

withstanding high burst pressure, in excess of about 300 bar or more;
a high abrasive resistance;
rated to withstand high temperatures and/or is at least partially flame-resistant;
an electrical conductivity which is substantially static-free.

Static-free electrical conductivity is particularly advantageous for applications where anti-static componentry is mandatory for safety reasons, such as underground and/or in coal mining.

The protective sleeve is particularly suitable for application into environments using high pressure lines, steam lines, fuel lines where splashing, misting and/or eruption of oil or fuel vapour may lead to an explosion or fire.

A fourth aspect provides a conduit assembly including:
at least one conduit;
at least one conduit connection assembly mounted on at least one end of the conduit, the conduit connection assembly including a conduit end connector configured to engage and fasten an end of the conduit;
an anchoring arrangement according to the second aspect discussed above, the anchoring arrangement being mounted around at least a portion of the conduit end connector of the conduit connection assembly; and
a protective sleeve sized to fit over the at least one conduit with a gap between the cover and the conduit,
wherein, in use, at least one securing element captures a portion of a co-located protective sleeve between the securing element and the mounting element of an anchor within a cooperating fastening groove of that anchor.

It is to be appreciated that the term "conduit" used herein can include any practical rigid walled pipe, flexible walled hose or other fluid carrying arrangement. In preferred embodiments, the conduit comprises a hose or pipe.

Aspects of present invention are particularly applicable for use with high pressure conduits, such as high pressure flexible hoses, used in an environment using high pressure hydraulic applications. However, it is to be appreciated that the invention is not limited to that application, and could instead be used in other safety applications such as within a domestic environment, for applications using substantially rigid conduits such as pipes or rigid lines, or in low pressure applications where lower pressure fluids or other working mediums are being conveyed through flexible pipes or hoses. Aspects of the present invention may also be used in applications where the lower pressure working medium is a dangerous substance upon contact, such as steam or superheated steam.

The anchors of the anchoring assembly can be located at any suitable position on the conduit assembly. However, in order to substantially enclose the conduit, it is preferred for one or more of the anchors of the anchor assembly to be arranged towards at least one, preferably each end of the protective sleeve. At least one anchor is mounted around a conduit connection assembly, and more preferably around at least a portion of at least one of the male connector or female connector of the conduit connection assembly. Preferably, at least one anchor is mounted around a conduit connection assembly connected to an end of the conduit. In some embodiments, the conduit assembly includes:

at least two conduit connection assemblies, each conduit connection assembly being mounted on opposite ends of the conduit; and at least two anchors, each anchor being located around a conduit end connector, the protective sleeve being mounted to the conduit assembly on and by the anchors of the anchor assembly.

Again, in some embodiments the conduit end connector includes a ferrule arrangement for fastening an end of the respective conduit to the conduit connection assembly. The ferrule arrangement includes a connector sleeve or nut operatively connected to a compression arrangement to attach the ferrule arrangement to and around a portion of the end of a respective conduit. The mounting body is preferably mounted around a portion of the connector sleeve or nut.

In some embodiments, the protective sleeve includes further anchoring points along its length at one or more points remote from its ends. These one or more anchors may anchor the protective sleeve to one or more external fixing points. Furthermore, the conduit assembly as described above can further include one or more anchors which can be arranged in any suitable anchor arrangement as determined by a person skilled in the art. For example, the one or more anchors can be arranged towards at least one of the end of the protective sleeve. Alternatively, or additionally, the one or more anchors may anchor the protective sleeve to an external fixing point. The protective sleeve can further, or alternatively, include one or more anchoring points, to which the one or more anchors can be anchored.

The anchoring assembly is preferably sized to space apart the inner surface of the protective sleeve from the outer surface of the conduit assembly. In this respect, each anchor functions as a spacer between the protective sleeve and conduit assembly. This provides a gap through which fluid can flow and escape from the sleeve in the event of conduit failure.

The protective sleeve is also preferably sized such to provide a gap between the protective sleeve and the conduit. The width of the gap can be advantageously arranged such that if fluid erupts through a rupture point in the conduit, the protective sleeve can dissipate the energy of the erupted fluid, and any reinforcing material contained within the conduit, such as metal wires etc, which may become exposed at the rupture point can be contained within the gap and not damage or rupture the protective sleeve. Preferably, the gap is arranged as an annular gap.

The protective sleeve is generally configured to have an inner diameter that is larger than an outer diameter of the conduit of the assembly. In one embodiment, the inner diameter of the protective sleeve is about 20% or more larger than the outer diameter of the conduit of the assembly, and more preferably between about 20% to about 60% larger than the outer diameter of the conduit of the assembly. However it will depend on the specific use for which the protective sleeve is applied. Some uses may require a greater or lesser diameter. For example, flexible hoses which are bent or do not remain static during use may require a relatively larger diameter sleeve to accommodate any bending and/or movement of the hose therein.

The protective sleeve preferably has a sleeve length which is between about 5% to about 15% longer than the length of conduit of the assembly, and more preferably the protective sleeve length is 5 to 15% longer than the length of conduit, preferably no more than 10% longer, more preferably about 10% longer than the length of conduit. However, the preferred length of the protective sleeve will depend on whether/how the protective sleeve is anchored, and the particular arrangement of the conduit within the conduit assembly. Generally, the greater the coverage provided by the protective sleeve located about the length of conduit, the greater the protection which can be provided along the length of conduit. Furthermore, when the protective sleeve locates about a substantial proportion of, or a substantially similar length to, the length of conduit, any fluid which erupts from a rupture point/zone in the conduit can be dispelled away from the rupture point/zone and towards the ends of the protective sleeve, which can minimise the chance of damage to nearby equipment or components, or any injury caused by fluid injection to personnel or otherwise.

In a preferred embodiment, the conduit of the conduit assembly is arranged as a high pressure hose which is rated to any practical working pressure. In a particularly preferred embodiment, the conduit assembly can include a conduit or hose being rated to a working pressure of about 300 bar or more.

BRIEF DESCRIPTION OF THE DRAWINGS

The present invention will now be described with reference to the figures of the accompanying drawings, which illustrate example embodiments of the present invention, wherein:

FIG. 9 is a (A) perspective view and (B) front cross-sectional view of an anchor of an anchoring assembly according to a third embodiment.

DETAILED DESCRIPTION

Figure 8:
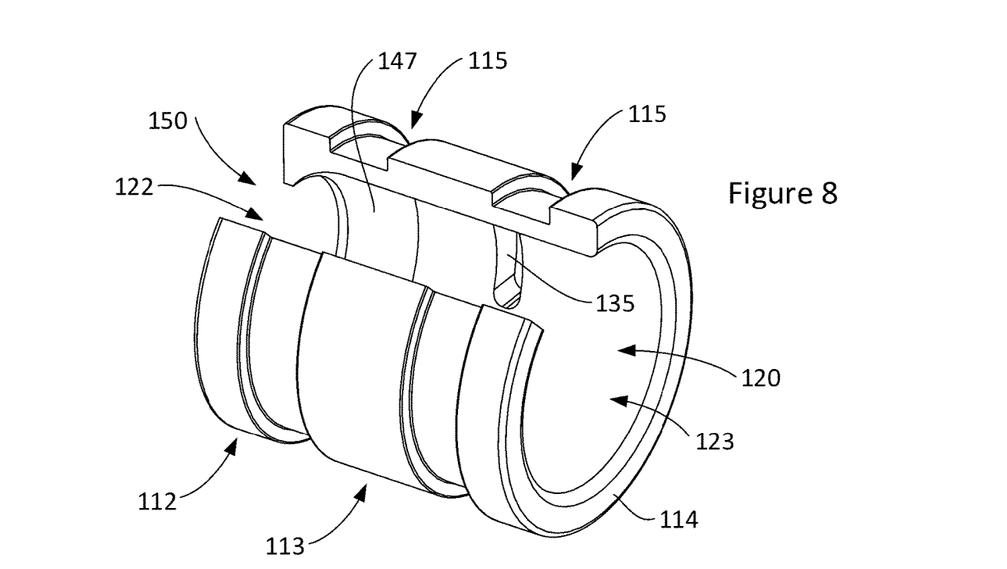
FIG. 8 is a perspective view of a mounting body an anchor of an anchoring assembly according to a second embodiment.
Figures 9A, 9B, 10, 11:
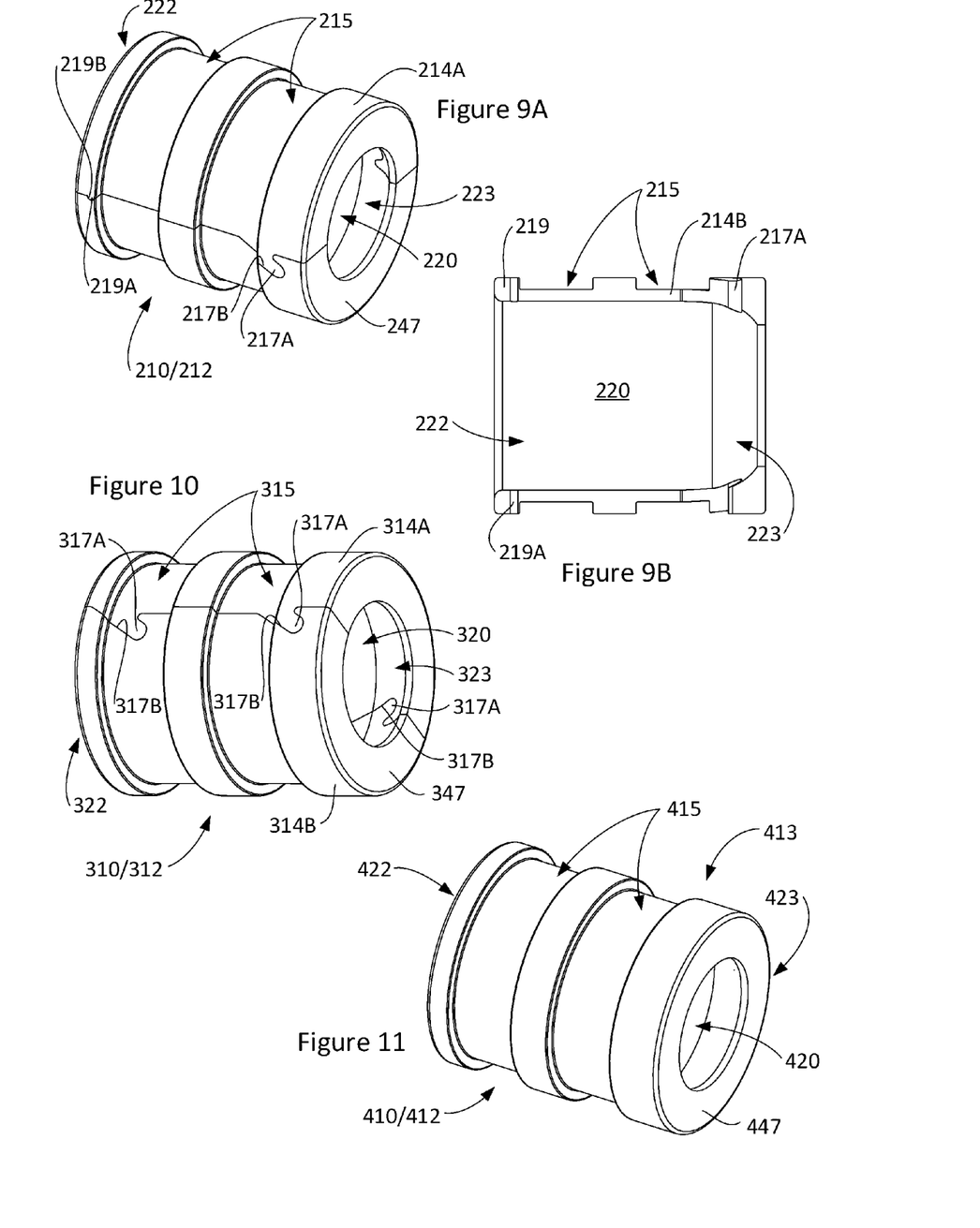
FIG. 10 is a perspective view of an anchor of an anchoring assembly according to a fourth embodiment.
FIG. 11 is a perspective view of an anchor of an anchoring assembly according to a fifth embodiment.
Figure 12:
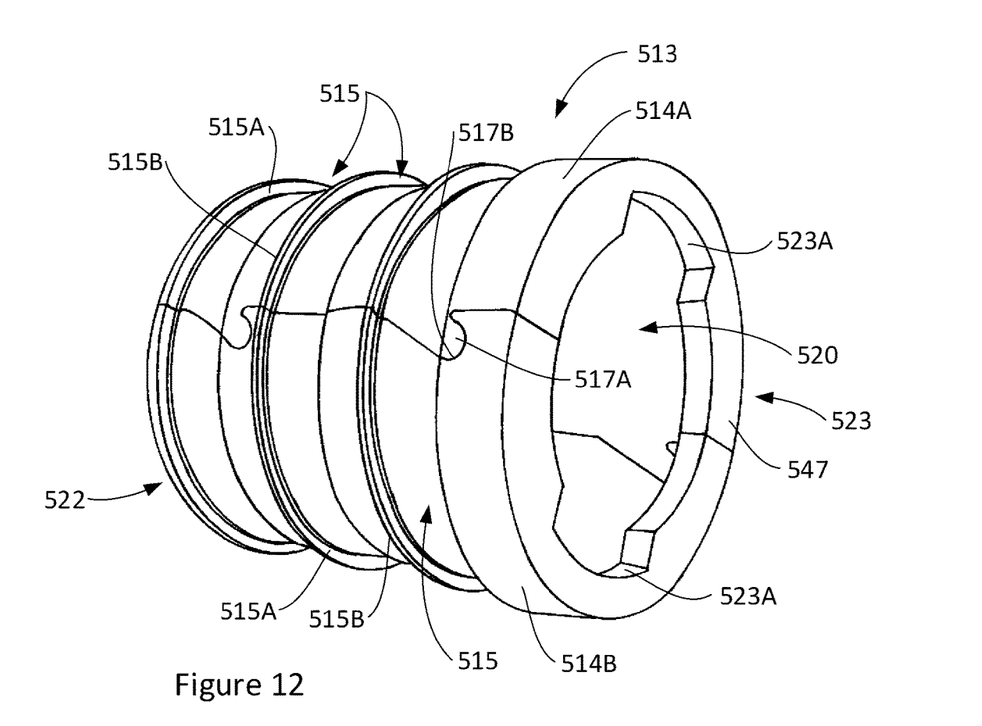
FIG. 12 is a perspective view of an anchor of an anchoring assembly according to a sixth embodiment with the half shells interconnected.
Figure 13:
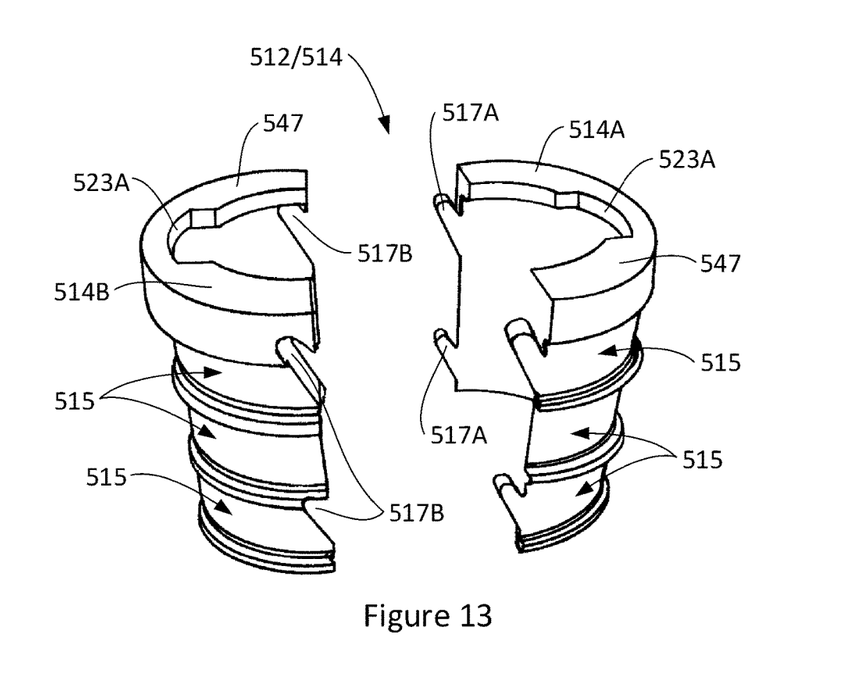
FIG. 13 is a perspective view of an anchor of an anchoring assembly according to a sixth embodiment with the half shells detached.

Aspects of the present invention relate to an anchor of an anchoring arrangement for a protective sleeve, an anchoring arrangement for a protective sleeve, a protective sleeve assembly incorporating an anchoring arrangement, and a conduit assembly which includes a protective sleeve assembly. A first embodiment of the anchoring arrangement 10, anchor 12, protective sleeve assembly 70 and conduit assembly 40 is illustrated in FIGS. 1 to 8. A second embodiment of the anchoring arrangement 110 is illustrated in FIG. 8. A third embodiment of the anchoring arrangement 210 is illustrated in FIG. 9. A fourth embodiment of the anchoring arrangement 310 is illustrated in FIG. 9. A fifth embodiment of the anchoring arrangement 410 is illustrated in FIG. 11. Finally, a sixth embodiment of the anchoring arrangement 510 is illustrated in FIGS. 12 and 13.

Referring firstly to the first embodiment illustrated in FIGS. 1 to 7, there is shown an anchoring arrangement 10, an anchor 12, a conduit assembly 40 and a protective sleeve assembly 70 according to a first embodiment.

Figure 1:
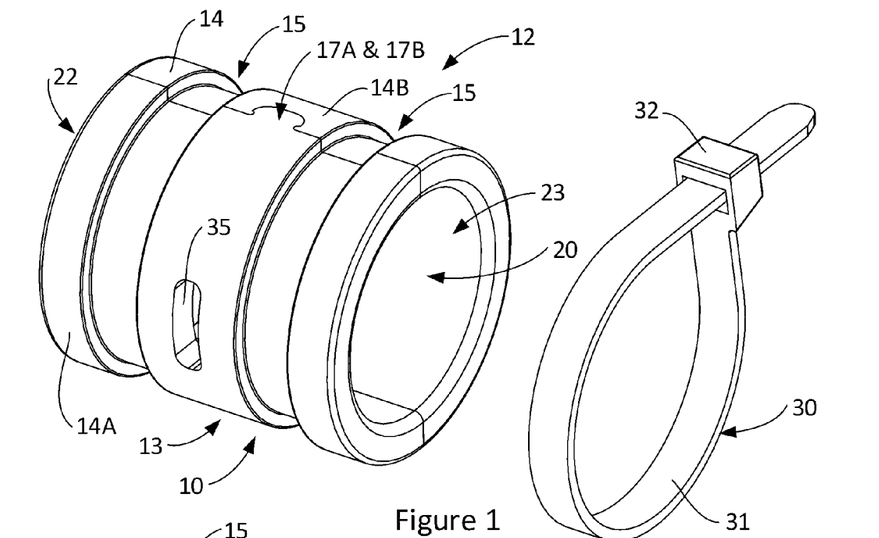
FIG. 1 is a perspective view of an anchor of an anchoring assembly comprising a mounting body and a securing element according to a first embodiment of the present invention.

The illustrated anchoring arrangement 10 comprises one or more anchors 12 shown in FIG. 1. Each anchor 12 comprises a mounting sleeve 14 which cooperates with a securing band 30.

Figures 2, 3:
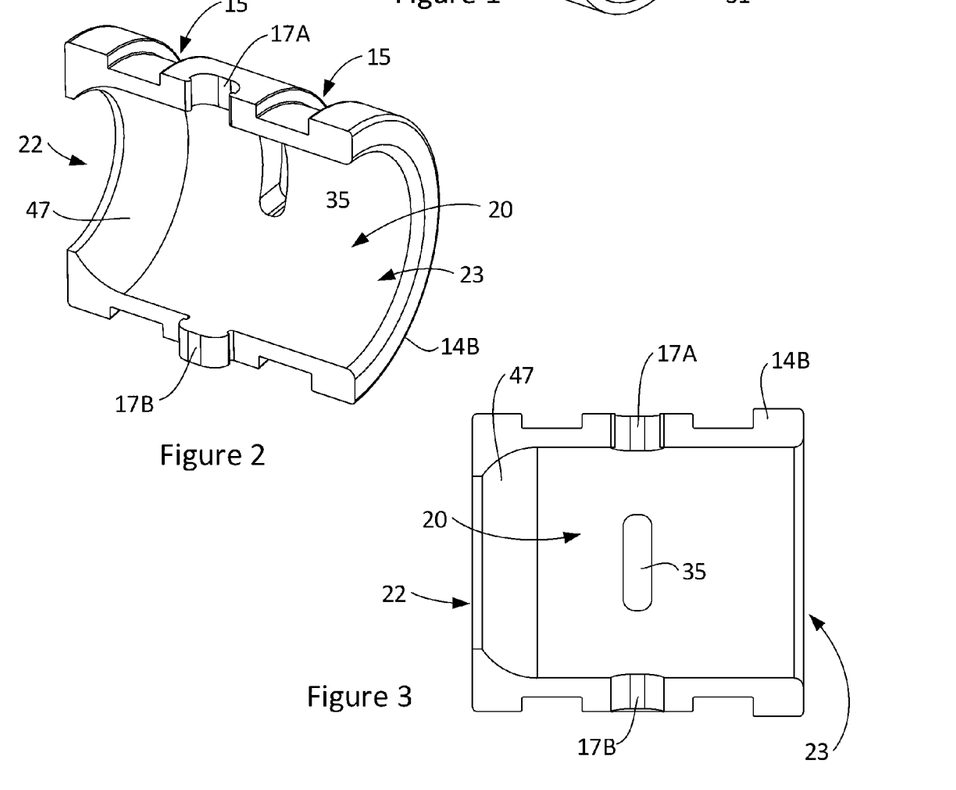
FIG. 2 is a perspective view of a one releasably securable section of the mounting body of the anchoring assembly shown in FIG. 1.
FIG. 3 is a front elevational view of a one releasably securable section of the mounting body of the anchoring assembly shown in FIG. 1.

The mounting sleeve 14 comprises a generally cylindrical element formed from two interengageable half shells 14A and 14B which move between an open position, in which the two half shells 14A and 14B are apart, and a closed position in which the two half shells 14A and 14B are releasably fastened together using the cooperating fastening elements 17A and 17B. As best shown in FIG. 2, these cooperating fastening elements 17A and 17B comprise complementary and interengaging pin 17B and recess 17A in which the pin 17B has a shape which interlocks within the shape of the recess 17B. However, it should be appreciated that the cooperating fastening elements 17A and 17B could comprise other suitable interlockable formations in other embodiments including (but not limited to) at least one of a clasp, clip, pin, peg, plug, lock, tie, latch, or hook.

In the open position, each shell 14A and 14B (best shown in FIGS. 2 and 3) are separated with cooperating fastening elements 17A and 17B spaced apart to allow an object, such as a pipe, tube or other conduit and/or conduit end connectors to be inserted between the half shells 14A and 14B. The half shells 14A and 14B can then be seated around a conduit end connector (for example end connector 42 in FIG. 4) and connected together using cooperating fastening elements 17A and 17B to move the mounting sleeve 14 into the closed position (as shown in FIGS. 1 and 5).

In the open position, each shell 14A and 14B (best shown in FIGS. 2 and 3) are separated with cooperating fastening elements 17A and 17B spaced apart to allow an object, such as a pipe, tube or other conduit and/or conduit end connectors to be inserted between the half shells 14A and 14B. The half shells 14A and 14B can then be seated around a conduit end connector (for example end connector 42 in FIG. 4) and connected together using cooperating fastening elements 17A and 17B to move the mounting sleeve 14 into the closed position (as shown in FIGS. 1 and 5).

Figure 4:
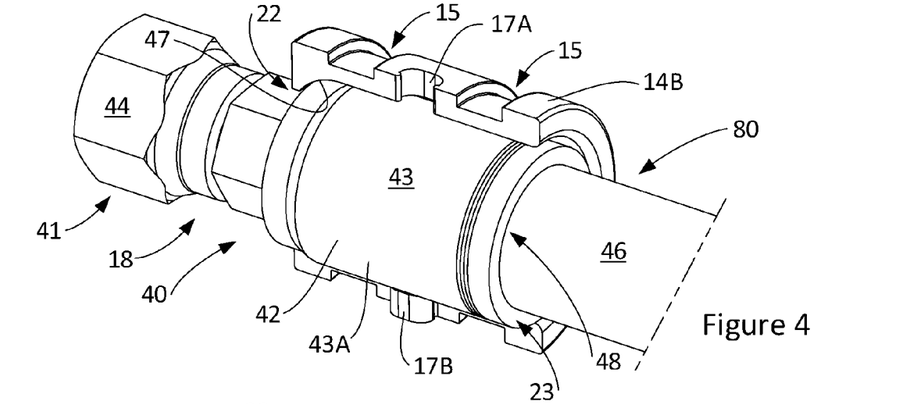
FIG. 4 is a perspective view of a first section of the mounting body of the anchoring assembly illustrated in FIG. 1 mounted around a conduit end connector of a conduit assembly.
Figure 5:
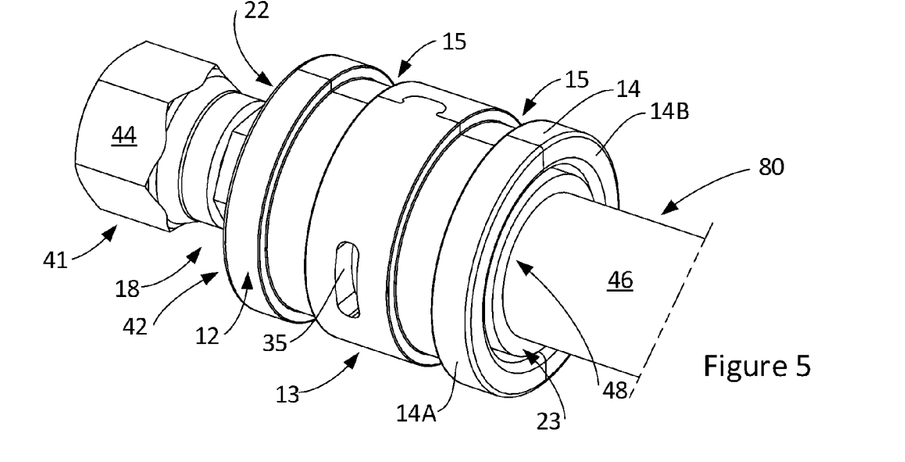
FIG. 5 is a perspective view of the assembled sections of the mounting body of the anchoring assembly illustrated in FIG. 1 mounted around a conduit end connector of a conduit assembly.

The mounting sleeve 14 of each anchor 12 of the anchoring assembly 10 is designed to be removably mounted around a portion of a conduit end connector 42, for example as shown in FIG. 4. The illustrated conduit end connector 42 comprises a fitting which includes a ferrule connector 43 which includes a connector sleeve 43A operatively connected to a compression arrangement (internal details not shown), which is mounted around an end of a conduit 46 to connect that conduit to that fitting. It should be appreciated that ferrule type connectors 43 typically have a male-stem portion (not shown) that is insertable into a hose end and a ferrule/connector sleeve 43A that is concentric with the male-stem, Together, the male-stem and connector sleeve 43A define an annular cavity (not shown) for receiving a hose end. A fitting is retained on the hose by pinching the hose end in the annular cavity between the ferrule sleeve 43A and stem, such as by either radially reducing some part or element of the ferrule sleeve, or by radially increasing the size of the male-stem. The mounting body 14 is mounted around a portion of the connector sleeve 43A.

As best shown in FIGS. 2, 3 and 4, the mounting sleeve 14 therefore includes an internal cavity 20 which longitudinally extends through the body of the mounting sleeve 14. The internal cavity is bounded at the two axial ends of the mounting sleeve 14 by two openings 22, 23 through which a portion of the conduit connector assembly 18 and/or conduit 46 extends when mounted on a conduit end connector 42. Each illustrated opening 22, 23 comprise a circular shaped opening, and are designed to be aligned with a specific section of the conduit end connector 42. Connection fixture opening 22 is designed to receive and be seated over the end of the conduit end connector 42 proximate the conduit connection fixture, for example a female nut 44 as shown in FIG. 5. Conduit opening 23 is designed to receive and be seated over a portion of the conduit end connector 42 proximate the conduit receiving end 48 of conduit end connector 42 (again as best shown in FIG. 5). It should be appreciated that the conduit receiving end 48 of the conduit end connector 42 comprises the end through which a conduit 46 is receives and extends out from when mounted within the conduit end connector 42.

As best shown in FIG. 4, the inner cavity 20 has a cooperative configuration to the portion of the conduit end connector 42 it is designed to receive and be seated about, which in the illustrated embodiment is the connector sleeve 43A. The inner cavity 20 also includes a stop formation, in this case a curved or tapered section 47 which reduces the internal diameter of the cavity towards the conduit opening 22 of the mounting sleeve 13. As shown in FIG. 4, in use, the stop formation 47 abuts the shoulder or connection fixture end 49 of the conduit end connector 42. This engagement prevents the mounting sleeve 14 from moving axially along length of conduit end connector 42 towards a conduit receiving opening end 48 of the conduit end connector 42.

The illustrated mounting sleeve 14 has an outer side 13 which includes two annularly extending fastening grooves 15. Each fastening groove 15 is longitudinally (axially relative to the longitudinal axis of the mounting sleeve 14) spaced apart along the length of the mounting sleeve 14. It should be appreciated that any number of fastening grooves 15 could be used (including a single fastening groove 15) for the function described below. Each fastening grooves 15 comprises a channel which extends around the outer side of the mounting sleeve 14. Each fastening groove 15 is used as a formation or anchor point in the mounting body 14 for receiving a cooperating securing band 30 (FIG. 1(B)). The illustrated fastening grooves 15 are therefore used to releasably secure a protective sleeve 72 to the anchoring assembly 10 using a securing band 30. The each shell 14A, 14B of the mounting sleeve 14 also includes an aperture 35.

The illustrated securing band 30 comprises a conventional cable tie. The cable tie can be made from any suitable material. Examples include cable ties made from a polymer, for example nylon cable ties (such as produced by HellermannTyton, although it should be appreciated that other similar cable ties could also be used), or cable ties made from metal, such as stainless steel (for example stainless steel cable ties manufactured by Bandimex Befestigungssysteme GmbH, although it should be appreciated that other similar cable ties could also be used). It should be appreciated that any suitable elongate fastener could be used for the same function, including (but not limited to) at least one of a string, thread, thong, lace, ribbon, strap, tape, tie, line, rope, cable, wire, ligature; twine, yarn, elastic, braid, or cord. The securing band 30 includes an elongate strap 31 which is configured to be receivable within a cooperating fastening groove 15 of the mounting sleeve 14. In use, the elongate strap 31 of at least one securing band 30 captures a portion of a co-located protective sleeve 72 between the securing band 30 and the mounting sleeve 14 and within the cooperating fastening groove 15. The securing band 30 is fastened in place using strap fastening arrangement 32, which can be of a conventional cable tie configuration (ratchet type fastener).

It should be appreciated that in other embodiments (not illustrated) the mounting body 114 could be formed as unitary body, such that the half shells 14A and 14B are integrally formed together as a single body.

FIG. 8 illustrates a second embodiment of an anchor 112 for use in an anchoring arrangement 110. The anchor 112 is used in conjunction with cable tie 30 as shown in FIG. 1B. The illustrated anchor 112 comprises a mounting sleeve 114 having a number of similar features as described for the first embodiment, including a shaped internal cavity 120 which includes stop formation 147, and an outer surface 113 which includes fastening grooves 115 for receiving a cable tie 30 as described above. It should be appreciated that like features of this second embodiment have been provided with the same reference numbers as the first embodiment illustrated in FIGS. 1 to 7 PLUS 100, and that the associated description with respect to the first embodiment equally applies to this second embodiment. This second anchor embodiment differs from the first embodiment in that the mounting element 114 is configured as a resilient clip as opposed to being formed of two interengageable sections. The clip form of this embodiment of the mounting body 114 is designed with a longitudinal opening 150 through which, in use, a section of a conduit assembly 80 can pass to removably locate the mounting body 114 onto a portion of a conduit end connector 42 of a conduit connector assembly 18. The mounting body 114 is preferably designed to be resiliently deformable to allow the longitudinal opening 150 to be widened to receive and fasten the mounting body 114 around a portion of the conduit end connector 42.

FIG. 9 shows an alternate embodiment of anchor 212 which cooperate with a securing band 30. It should be appreciated that like features of this third embodiment have been provided with the same reference numbers as the first embodiment illustrated in FIGS. 1 to 7 PLUS 200, and that the associated description with respect to the first embodiment equally applies to this third embodiment. Again, the anchor 212 comprises a mounting sleeve 214 formed as a generally cylindrical element formed from two interengageable half shells 214A and 214B which move between an open position, in which the two half shells 214A and 214B are apart, and a closed position in which the two half shells 214A and 214B are releasably fastened together using the cooperating fastening elements 217A and 217B. Again, these cooperating fastening elements 217A and 217B comprise complementary and interengaging pin 217B and recess 217A in which the pin 217B has a shape which interlocks within the shape of the recess 217B. In this embodiment, the fastening elements 217A and 217B are positioned near the connection fixture opening 222, and is angled to provide greater resistance to pressure/force applied to the two half shells 214A and 214B. As can be observed the angle is directed towards the connection fixture opening 222, and resists, in use, pulling force applied by a protective sheath during a conduit burst or similar scenario. A further fitting bead 219A and groove 219B is provided near the conduit opening 223. Again, the inner cavity 220 has a cooperative configuration to the portion of the conduit end connector 42 it is designed to receive and be seated about as shown in FIG. 9(B) and described in relation to the first embodiment.

FIG. 10 shows an variation of the embodiment of anchor 212, in this case anchor 312 which includes two pairs of axially spaced apart (relative to the longitudinal axis of the anchor 312 running through the central length of the anchor 312) cooperating fastening elements 317A and 317B. The use of two pairs of fastening elements 317A and 317B adds further strength to the connection between the half shells 314A and 314B. It should be appreciated that in some embodiments, the mounting element 314/anchor 312 could include three or more pairs of fastening elements where even further connective strength is required. It should be appreciated that like features of this fourth embodiment have been provided with the same reference numbers as the third embodiment illustrated in FIG. 9 PLUS 100, and that the associated description with respect to the third embodiment equally applies to this fourth embodiment. It should be appreciated that the fastening elements 317A and 317B can be of any shape or form at a suitable angle to add further strength to the connection between the half shells 314A and 314B.

FIG. 11 shows another variation of the embodiment of anchor 212, in this case anchor 412 which takes all the features of anchor 212 but is made as an integral cylinder body. Essentially, the half shells 214A and 214B are integrally formed into a single body. It should be appreciated that like features of this fifth embodiment have been provided with the same reference numbers as the third embodiment illustrated in FIG. 9 PLUS 200, and that the associated description with respect to the third embodiment equally applies to this fifth embodiment (though without the use of half shells). This embodiment of the anchor 412 is mounted over a section of a conduit assembly (for example 80 in FIG. 4) by threading the mounting body 414 onto a portion of a conduit end connector 42 of a conduit connector assembly 18 through opening 422, so that the ferrule sleeve 23A or other connector element of the conduit connector assembly is received in internal cavity 420.

FIGS. 12 and 13 illustrates a sixth embodiment of an anchor 512 for use in an anchoring arrangement 510. The anchor 512 can be used in conjunction with cable tie 30 as shown and described in relation to FIG. 1B. The illustrated anchor 512 comprises a mounting sleeve 514 having a number of similar features as described for the first, third and fourth embodiment, including a shaped internal cavity 520 which includes stop formation 547, and an outer surface 513 which includes fastening grooves 515 for receiving a cable tie 30 as described above. It should be appreciated that like features of this sixth embodiment have been provided with the same reference numbers as the first embodiment illustrated in FIGS. 1 to 7 PLUS 500, and that the associated description with respect to the first, third and fourth embodiments equally applies to this sixth embodiment.

Again, the anchor 512 comprises a mounting sleeve 514 formed as a generally cylindrical element formed from two interengageable half shells 514A and 514B which move between an open position, in which the two half shells 514A and 514B are apart, and a closed position in which the two half shells 514A and 514B are releasably fastened together using two axially spaced apart (relative to the longitudinal axis of the anchor 512 running through the central length of the anchor 512) sets of cooperating fastening elements 517A and 517B. Like the fourth embodiment, these cooperating fastening elements 517A and 517B comprise angled complementary and interengaging pin 517B and recess 517A. The angle is directed towards the connection fixture opening 22, and resists, in use, pulling force applied by a protective sheath during a conduit burst or similar scenario.

In this embodiment, mounting sleeve 514 has an outer side 513 which includes three annularly extending fastening grooves 515. Again, it should be appreciated that any number of fastening grooves 515 could be used. Each fastening grooves 515 of this embodiment comprises a channel which extends around the outer side of the mounting sleeve 514. Each fastening groove 515 is used as a formation or anchor point in the mounting body 514 for receiving a cooperating securing band 30 (FIG. 1(B)). Each fastening groove 515 has an step side having an engagement face 515A designed to engage a side of the securing band 30 and retain the band 30 in place when pressure is applied, and a ramp side 515B providing a ramped face. The ramped face cannot be used as a secure engagement face for retaining a cooperating securing band 30. The provision of a ramped side 515B also provides a visual guide on the orientation in which the mounting element 514 should be arranged over a conduit end connector 42 of a conduit connector assembly 18. The ramped side 515B also acts a physical guide to have smooth insertion of the mounting element 514 into the protective sleeve 72 during assembly. The ramped faces (highest end to lowest end of ramp) should be orientated to point away from the conduit end connector 42 and towards the hose/conduit when the mounting element 514 is mounted over a conduit end connector 42 (for example as shown in FIGS. 4 to 7).

Figure 7:
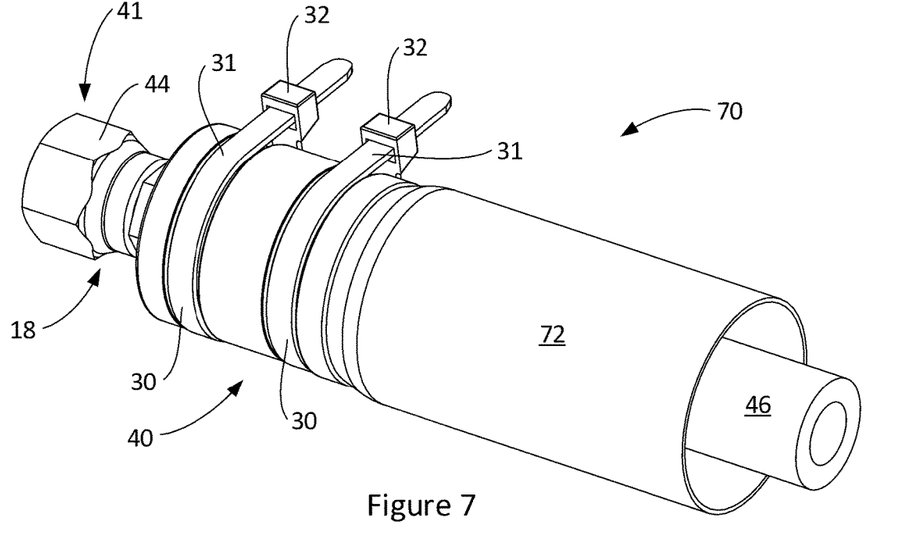
FIG. 7 is a perspective view of the anchoring arrangement of FIG. 1 assembled around a conduit end connector holding a protective sleeve in place over a conduit assembly.

The illustrated fastening grooves 515 are used to releasably secure a protective sleeve 72 to the anchoring assembly 10 using a securing band 30, in a similar arrangement as shown in FIG. 7. Again, the securing band 30 comprises a cable tie, made from a polymer such as nylon (such as produced by HellermannTyton, or other manufacturer), or metal, such as stainless steel (for example the stainless steel cable ties manufactured by Bandimex Befestigungssysteme GmbH, or other manufacturer). In use, the elongate strap 31 of at least one securing band 30 captures a portion of a co-located protective sleeve 72 between the securing band 30 and the mounting sleeve 514 and within the cooperating fastening groove 515.

The mounting body 523 again has two generally circular openings. Connection fixture opening 522 is designed to receive and be seated over the end of the conduit end connector 42 proximate the conduit connection fixture. Conduit opening 523 is designed to receive and be seated over a portion of the conduit end connector 42 proximate the conduit receiving end 48 of conduit end connector 42. In this sixth embodiment, the stop formation 547 comprises a radially extending annular flange (relative to a longitudinal axis extending along the length of the mounting element). The conduit opening 523 is formed within that flange. The conduit opening 523 has a generally circular shape, with the addition of two opposing radial cut-out sections 523A. These cut-out sections 523A provide drainage/fluid release ports for any fluid that may be trapped within a cooperative or co-located protective sleeve (for example in the case of conduit failure, causing fluid leakage from that damaged conduit into the protective sleeve). The cut-out sections 523A also provide a positive verification that a conduit failure has occurred alerting personnel or staff member in the vicinity of the conduit assembly.

It should be appreciated that in other embodiments (not illustrated) the mounting body 514 could be formed as unitary body, such that the half shells 514A and 514B are integrally formed together as a single body.

Whilst not illustrated, it should be appreciated that in other embodiments the mounting sleeve could comprises a plate, half pipe, or similar element which is designed to seat over at least a portion of a conduit end connector. For example, in one embodiment the mounting sleeve could comprise one half shell 14B (as shown in FIG. 2) fitted on the conduit end connector 42. The half shell would be held in position on conduit end connector 42 through the application of the securing bands 30 once the protective sleeve 72 is fixed in place between the mounting sleeve 14B and the securing band 30.

The anchors 12, 112, 212, 312, 412, 512 can be made from any suitable material. In preferred embodiments the anchors 12, 112, 212, 312, 412, 512 are generally made from steel such as carbon steel, spring steel or stainless steel. However, it should be appreciated that the anchors 12, 112, 212, 312, 412, 512 can be made from other materials, such as reinforced plastics or composites. The anchors 12, 112, 212, 312, 412, 512 may be suitably coated or plated with a corrosion resistant material. The anchors 12, 112, 212, 312, 412, 512 can be made from any suitable manufacturing method such as casting, preferably die casting using any suitable material i.e. Zinc Alloy.

It should be appreciated that the second embodiment of the anchoring arrangement 110, third embodiment of the anchoring arrangement 210, fourth embodiment of the anchoring arrangement 310, fifth embodiment of the anchoring arrangement 410, sixth embodiment of the anchoring arrangement 510 and the plate embodiment described above can be used in a similar configuration as is illustrated and will be described in relation to the protective sleeve assembly 70 and conduit assembly 40 shown in FIGS. 4 to 7.

In use, each of the illustrated anchoring arrangement 10, 110, 210, 310 are mounted around a conduit assembly 80. The anchoring arrangement 10, 110, 210, 310, 410, 510 is designed to seat around a portion of a conduit end connector 42 of a conduit connector assembly 18 as described above. One exemplary form of a conduit end connector 42 is shown in FIG. 4.

As illustrated by example in FIGS. 4 to 7 for the first embodiment of the anchoring arrangement 10, the anchor 12 can be mounted on a selected conduit end connector 38 of a female connector/coupling 41 of a conduit connector assembly 18. The conduit end connector 38 is connected to the female connector nut 44 at one end and a hose 46, in this case a high pressure hose on the other end. It should be appreciated that whilst only one end of the conduit assembly 80 is illustrated, the assembly 80 would include a pair of connectors 40 (only one of which is illustrated), one at each end of the hose 46 having a similar configuration. The connectors 40 could adopt any suitable form and need not be of the type illustrated.

The conduit assembly 80 may be used as a hydraulic or pneumatic line, and may contain or transfer a fluid or other working medium, for example oil or air, so as to provide a control or power action. It may also be used as a transport line to supply material, for example the fluid or working medium itself or material entrained therein, and for example may be used as pump lines.

Due to the high pressures that are generally involved, significant safety concerns may arise if the hose 46 in the conduit assembly 80 fails. For example, fluid ejected from a burst or damaged hose may splash, spray or mist nearby machinery components or personnel, which may cause a significant fire hazard, or may even be injected into a person under high pressures, causing serious injury or even death. Also, the forces involved in the failure may cause a failure in the assembly at a point at or near a hose anchor or coupling, such that one end of the hose becomes free to whip about violently, causing harm and damage should the free end of the hose strike nearby machinery or personnel.

A protective sleeve 72 is provided around the hose 46 designed to mitigate against fluid ejection problems in a damaged or burst hose and to eliminate or at least more effectively restrain any whipping movement occurring in a failed hose assembly. The protective sleeve 72 can be constructed from any suitable material. An example of one suitable protective sleeve 72 is described in the Applicant's earlier international patent publication WO2010/003174 which comprises a multilayer construction of a woven outer layer and an inner elastomeric layer. The protective sleeve 72 may be formed of a closed-weave material, and may be for example made of textiles material. It may for example be made of multi-filament nylon. This can provide a strong protective sleeve 72 that is able to resist whipping and fluid forces, and that can also prevent fluid from escaping through its surface. However, it should be appreciated that any suitable construction can be used with the present invention. In some embodiments, the protective sleeve 72 is formed from a densely woven polyamide sleeve that is FRAS (Fire Resistant and Anti-Static) rated.

Whilst not shown in the embodiment in FIG. 2, it should be appreciated that the protective sleeve 72 would be held in place over the conduit assembly 80 and conduit/hose 46. It will be appreciated, however, that a single anchor 12 could be used which is arranged towards at least one of the end of the protective sleeve 72, or that other anchor arrangements could alternatively, or additionally, be used depending on the requirements of the conduit assembly 80.

Advantageously, the one or more anchors 14 can be arranged such that the protective sleeve 72 can at least partially capture any fluid or other working medium which erupts through a rupture point/zone of the hose 46. Furthermore, the one or more anchors 14 can be arranged in any suitable arrangement which may advantageously minimise or prevent a hose or other form of conduit from whipping if fluid or other working medium erupts through a rupture point/zone of a hose or other form of conduit which is covered by the protective sleeve 72.

Figure 6:
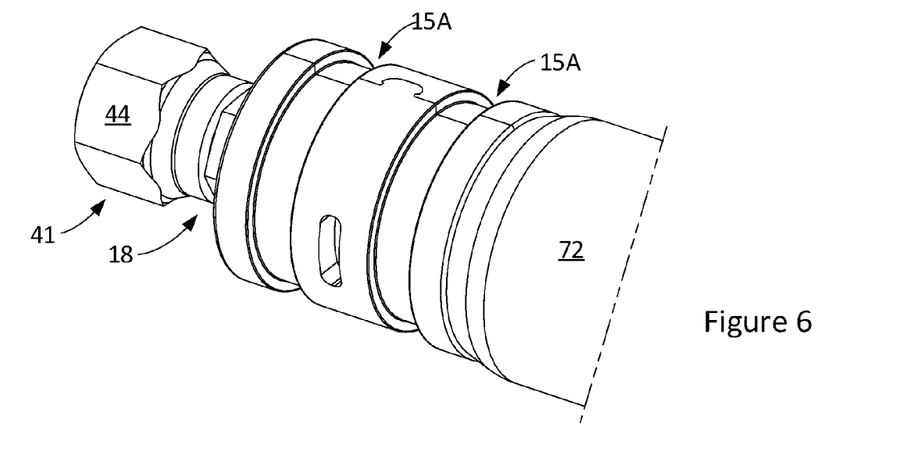
FIG. 6 is a perspective view of a protective sleeve arranged over the mounting body mounted around a conduit end connector of a conduit assembly of FIG. 5.

FIGS. 4 to 7 show the application steps of the first embodiment of the anchoring arrangement 10 over a conduit assembly 80. Firstly, the mounting sleeve 14 is placed in the open condition with the two half shells 14A and 14B are apart. Each half shell 14A, 14B is then fitted around a conduit end connector 38 (FIGS. 4 and 5) and are fastened together using the cooperating fastening elements 17A and 17B to move the mounting sleeve 14 into the closed position (as shown in FIG. 5). As shown in FIG. 5, the mounting element 14 is arranged with the connection fixture opening 22 seated over the end of the conduit end connector 42 proximate the conduit connection fixture, in this case a female nut 44. A protective sleeve 72 is then fitted over the mounting sleeve 14 as shown in FIG. 6, with a portion covering the fastening grooves 15 (as shown by the recesses 15A in the protective sleeve 72 illustrated in FIG. 5). The protective sleeve 72 is fastened or anchored onto the mounting element using two securing bands 30, which are fastened around the mounting element 14 and protective sleeve 72 proximate the fastening grooves 15, to capture a portion of a co-located protective sleeve 72 between the securing band 30 and the mounting sleeve 14 and within the cooperating fastening groove 15. The securing band 30 is fastened in place using strap fastening arrangement 32, which is typically of a conventional cable tie configuration.

Whilst not illustrated, it is possible to use additional anchors (typically of an alternate configuration) to anchor the protective sleeve 72 to an external fixing point (not shown), or to one or more of the conduit connectors 40 of the conduit assembly 80.

The protective sleeve 72 and anchors 12, 112, 212, 312, 412, 512 can be sized and configured to provide a gap (i.e. a loose fit) between the protective sleeve 72 and the hose 46. The width of the gap can be advantageously arranged such that if fluid erupts through a rupture point in the hose 46, the protective sleeve 72 can dissipate the energy of the erupted fluid, and any fluid which ejects from the hose 46 can be dispelled through the gap and towards or out of the ends of the protective sleeve 72. Furthermore, any reinforcing material contained within the hose 46, such as metal wires etc, which may become exposed at the rupture point can be contained within the gap and not damage or rupture the protective sleeve 72. Advantageously, the gap can be arranged as an annular gap.

The protective sleeve 72 is a loose fit over the hose 46, and is sized so that there is a gap between the hose 46 and the protective sleeve 72. The protective sleeve 72 may for example, in a relaxed state, have an inner diameter that is greater than the outer diameter of the hose 46 by about 25% or more, for example between about 25% to about 50%, with 50% being particularly advantageous. The protective sleeve

72 may be sized so that it can extend over the conduit connection assembly 18, so that it can be placed over the conduit assembly 80 after the hose 46 and conduit connection assembly 18 are connected together.

While the embodiments shown in the Figures are not shown to scale, in a relaxed state the protective sleeve 72 is preferably sized to have an inner diameter that is in excess of about 20% larger than an outer diameter of the hose 46 of the conduit assembly 80. In a particularly preferred embodiment, the inner diameter of the protective sleeve 72 is between about 20% to about 60% larger than the outer diameter of the hose 46 of the conduit assembly 80. Generally, the larger the hose diameter, the larger the ratio of the protective sleeve 72 inner diameter to the protective sleeve 72 outer diameter that is required. However, a protective sleeve 72 with a larger relative outer diameter than the hose outer diameter may be used for applications where the hose (or other form of conduit) is flexible or subject to bending.

In one embodiment (not shown) the protective sleeve 72 length can be arranged to extend over, or past, one or each conduit connector 40 of the conduit assembly 80 which are located at or near to the ends of the protective sleeve 72. This can provide the advantage in a situation where a hose conduit assembly 80 fails at or near a coupling 40, and the additional length of the protective sleeve 72 extending over, or past, the hose couplings 16 can allow the protective sleeve to move, flex or deform in response to the pressure applied to the protective sleeve 72 by the ejected fluid or working medium during the failure, whilst still providing at least partial protection in the area of the conduit connector 40.

Preferably, the protective sleeve 72 has a sleeve length which is between about 5% to about 20% longer than the length of hose 46, and more preferably the length of the protective sleeve 72 is about 10% longer than the length of hose 46 of the conduit assembly 80.

Generally speaking, the greater the coverage provided by the protective sleeve 72 located about the length of hose 46, the greater the protection that can be provided along the length of hose 46. Furthermore, when the protective sleeve 72 locates about a substantial proportion of, or a substantially similar length to, the length of hose 46, any fluid which erupts from a rupture point/zone in the hose 46 can be dispelled further away from the rupture point/zone of the hose 46 towards the ends of the protective sleeve 72. This can minimise the spraying, misting or ejection of fluid or other working medium onto nearby machinery or components, and can also reduce the chance of injury to personnel caused by fluid injection or spraying.

The protective sleeve 72 provides a dual role should the conduit assembly 80 fail. Thus, it suppresses or retarding the ejection of pressurised fluid from the hose 46 into the surroundings, and also restrains the movement of the hose 46, so that whipping of the hose 46 is limited or eliminated.

For example, should the hose 46 separate from one of the conduit connection assembly 18, the fluid ejected from the hose end will remain in the protective sleeve 72 and be channelled along its length. Even if fluid did burst through the protective sleeve 72, it would have expended a good deal of its energy, and so would be able to cause less harm.

Further, the hose 46 is constrained to whip within the protective sleeve 72, and the protective sleeve 72 is able to give and to absorb a lot of the energy of the hose 46, whilst itself being restrained to move only within a limited area. Even with burst-through of fluid, the hose protective sleeve 72 will generally be able to keep sufficient integrity along its length to anchor the hose assembly against violent movements.

The loose fitting and sizing of the protective sleeve 72 has been found to be advantageous in that the force of the ejected fluid can significantly drop between its ejection through the hose 46 and its hitting of the protective sleeve 72, thereby reducing the possibility of the protective sleeve 72 being penetrated.

It also has the advantage that it allows the fluid that hits the protective sleeve 72 to be redirected along the gap G along the length of the hose 46, and this can help to dampen the whipping action of the hose 46 through a redirection of the fluid forces longitudinally along the length of the protective sleeve 72.

A further point is that the hose 46 often includes wire-reinforcement or the like, and when the hose 46 bursts, these reinforcement materials may be dislodged or expelled in a violent manner. The protective sleeve assembly 70 has the advantage that it can reduce the possibility of these reinforcements piercing the protective sleeve 72 if dislodged or expelled.

The protective sleeve 72 should be of a suitable strength such that it can withstand the forces associated with a failure of the associated hose 46, which will generally be explosive and comprise a sudden release of stored energy over a relatively short period.

The strength required will generally depend on the pressures involved, the hose 46 and the like. As one example, for a hose of Vz diameter operating at 350 bar, an appropriate protective sleeving may have a tensile strength of around 400 Kg force or more per layer (two layers/sleeves may therefore have 800 Kg force tensile strength).

The protective sleeve 72 may be made to be flame-resistant and anti-static. It may for example be made of materials to which conductive dyes or paints have been applied, and/or may include a weave of conductive material, for example steel wire, therein. It may for example have a resistance of less than 1 MΩ/m, and/or may conform to other suitable standards, for example Australian standard AS2660.

Those skilled in the art will appreciate that the invention described herein is susceptible to variations, modifications and/or additions other than those specifically described. It is understood that the invention includes all such variations, modifications and/or additions which fall within the spirit and scope of the present invention.

Furthermore, it is understood that the features of the disclosed embodiments may be combined in a number of different ways to create other embodiments which can provide effective burst suppression and/or whipping conduit restraint.

The description of drawings provided above refers primarily to an anchoring arrangement for a protective sleeve configured to locate about a hose. However, the drawings are intended to be for illustrative purposes only, and it is therefore to be appreciated that the invention is intended for the more general application to a conduit (or conduits) such as, but not limited to, a hose or a pipe. The invention may be used in applications with any practical working pressure as suitable for the particular application required.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. An anchor of an anchoring arrangement for a protective sleeve configured to be located over a high pressure fluid conduit assembly, the high pressure fluid conduit assembly including a conduit end connector configured to engage and fasten an end of a conduit to a high pressure fluid conduit connection assembly, the anchor comprising:
- a mounting element which is configured to be removably mounted on and around at least a portion of the conduit end connector, the mounting element having an outer side having at least one fastening groove that extends around the outer side of the mounting element, and
- an inner cavity configured to receive a cooperating portion of the conduit end connector, the inner cavity including a stop formation located at one end of the inner cavity in the form of an annular flange that extends from an inner surface of the mounting element, the annular flange defines an opening that has a diameter that is smaller than a diameter of the inner cavity, the stop formation being configured to limit axial movement of the mounting element along length of the conduit end connector towards a conduit receiving end of the conduit end connector when the anchoring arrangement is mounted on and over the conduit assembly,
- wherein the at least one fastening groove is configured to receive a portion of the protective sleeve and at least one securing element such that the securing element captures a portion of the protective sleeve between the securing element and the mounting element within the at least one fastening groove.

2. The anchor according to claim 1, wherein the mounting element comprises a sleeve.

3. The anchor according to claim 2, wherein the sleeve ls configured as a ring, cylinder, partial ring or truncated cylinder.

4. The anchor according to claim 1, wherein the mounting element includes at least two axial ends defining openings through which a portion of the high pressure fluid conduit assembly extends when mounted on the conduit end connector.

5. The anchor according to claim 4, wherein the annular flange includes defines at least one cut-out section radially extending from one of the openings into the flange.

6. The anchor according to claim 1, wherein the mounting element is formed from at least two releasably securable sections.

7. The anchor according to claim 6, wherein the releasably securable sections comprise at least a first section and a second section, and each section includes at least one pair of cooperating fastening elements for releasably fastening each section together.

8. The anchor according to claim 7, wherein the cooperating fastening elements comprise at least one of a clasp, clip, pin, peg, plug, lock, tie, latch, or hook.

9. The anchor according to claim 6, wherein each section includes at least two pairs of cooperating fastening elements for releasably fastening each section together, each fastening element being axially spaced apart relative to the longitudinal axis of the mounting element.

10. The anchor according to claim 1, wherein the mounting element comprises a clip.

11. The anchor according to claim 10, wherein the clip defines a longitudinal opening through which a section of a conduit assembly can pass to removably locate the mounting element onto a portion of the conduit end connector of the high pressure fluid conduit connector assembly.

12. The anchor according to claim 1, wherein the fastening groove comprises an annularly extending channel which extends substantially around the outer side of the mounting element.

13. The anchor according to claim 1, wherein the mounting element defines at least two fastening grooves.

14. The anchor according to claim 13, wherein each fastening groove is spaced apart along a length of the mounting element.

15. An anchoring arrangement for a protective sleeve which locates, in use, over a high pressure conduit assembly, the high pressure conduit assembly including a conduit end connector configured to engage and fasten an end of a high pressure fluid conduit to a high pressure fluid conduit connection assembly, the anchoring arrangement comprising:
- at least one anchor according to claim 1; and
- at least one securing element configured to be receivable within a cooperating fastening groove of the mounting element,
- wherein, in use, at least one securing element captures a portion of a co-located protective sleeve between the securing element and the mounting element of an anchor within a cooperating fastening groove of that anchor.

16. The anchoring arrangement according to claim 15, wherein the securing element is configured to extend and engage over the portion of a protective sleeve.

17. The anchoring arrangement according to claim 15 wherein the at least one securing element comprises an elongate fastener.

18. The anchoring arrangement according claim 15, wherein the securing element comprises a cable tie.

19. A protective sleeve assembly comprising:
- a protective sleeve sized to fit over at least one high pressure fluid conduit with a gap between the protective sleeve and the high pressure fluid conduit; and
- an anchoring arrangement according to claim 15;
- wherein, in use, at least one securing element captures a portion of the protective sleeve between the securing element and the mounting element of an anchor within a cooperating fastening groove of that anchor.

20. A conduit assembly including:
- at least one high pressure fluid conduit;
- at least one high pressure fluid conduit connection assembly mounted on at least one end of the high pressure fluid conduit, the high pressure fluid conduit connection assembly including a conduit end connector configured to engage and fasten an end of the high pressure fluid conduit;
- an anchoring arrangement according to claim 15, the anchoring arrangement being mounted around at least a portion of the conduit end connector of the high pressure fluid conduit connection assembly; and
- a protective sleeve sized to fit over the at least one conduit with a gap between the cover and the high pressure fluid conduit, wherein, in use, at least one securing element captures a portion of the protective sleeve between the securing element and the mounting element of an anchor within a cooperating fastening groove of that anchor.

* * * * *